(12) United States Patent
Becker et al.

(10) Patent No.: US 7,591,894 B2
(45) Date of Patent: Sep. 22, 2009

(54) LUAP SCINTILLATOR

(75) Inventors: Arthur J. Becker, Ridgefield, CT (US); Yanqi Wang, Plainsboro, NJ (US); Bradley A. Roscoe, Ridgefield, CT (US); John Simonetti, Hamilton, NJ (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 11/563,359

(22) Filed: Nov. 27, 2006

(65) Prior Publication Data

US 2008/0121817 A1 May 29, 2008

(51) Int. Cl.
*C30B 1/04* (2006.01)
(52) U.S. Cl. .................... 117/3; 117/4; 117/8; 117/9
(58) Field of Classification Search .............. 117/3, 117/4, 6, 8, 9
See application file for complete search history.

(56) References Cited

U.S. PATENT DOCUMENTS 5,961,714 A * 10/1999 Melcher et al. ............... 117/13
6,437,336 B1 * 8/2002 Pauwels et al. ........... 250/361 R

OTHER PUBLICATIONS

Petrosyan et al., The Melt Growth of large LuAP single crystals for PET scanners, Nuclear Instrument and Methods in Physics Research A 537 (2005) 168-172.

Derdzyan et al., Growth and properties of LuAP co-doped with divalent or tetravalent impurities, Nuclear Instruments and Methods in Physics Research A 537 (2005) 200-202.

Korzhik et al., Search of New Scintillation Materials for Nuclear Medicine Applications, IEEE Transactions on Nuclear Science, vol. 48, No. 3, Jun. 2001.

Lempicki et al., Lutetium Aluminate: Spectroscopic and Scintillation Properties, IEEE Transactions on Nuclear Science, vol. 43, No. 3, Jun. 1996, pp. 1316-1320.

Szupryczynski et al., Scintillation and optical properties of LuAP and LuYAP crystals, 2005 IEEE Nuclear Science Symposium Conference Record, N35-28, pp. 1305-1309.

Lempicki et al., Cerium-Doped Aluminate Scintillators, Proc. Int. Conf. on Inorganic Scintillators and Their Applications, SCINT95, 1995, Delft University Press, The Netherlands, XP008092221. pp. 340-343.

* cited by examiner

*Primary Examiner*—Robert M Kunemund
(74) *Attorney, Agent, or Firm*—James McAleenan; Jody DeStefanis; Vincent Loccisano (57) ABSTRACT

An LuAP scintillation detector and a method for improving the light output and uniformity of an LuAP scintillator crystal is provided, wherein the method includes disposing the scintillator crystal in a predetermined environment at a threshold temperature to generate an initial scintillator crystal, annealing the initial scintillator crystal in the predetermined environment at the threshold temperature to create an annealed scintillator crystal and cooling the annealed scintillator crystal in the predetermined environment to a final temperature.

20 Claims, 8 Drawing Sheets

LUAP SCINTILLATOR

FIELD OF THE INVENTION

This disclosure relates generally to a scintillator material and more particularly to a method for improving the performance properties of Cerium (Ce) doped LuAP (Lutetium Aluminum Perovskite) scintillator material.

BACKGROUND OF THE INVENTION

A major goal of well logging is to gain insight into the reservoir and thereby maximize the amount of hydrocarbons recovered from an earth formation and in order to better develop techniques and methods to accomplish this, it is helpful to know as much as possible about the physical characteristics of the earth formation surrounding a well. For example, by continuously monitoring the oil saturation in an earth formation, which is typically expressed as a percentage by volume of oil in the pore space, secondary and tertiary techniques may be developed to use this oil saturation to enhance the recovery of the hydrocarbons.

It is well known in the oil and gas industry that physical characteristics of the formation surrounding a well, such as the chemical content of the formation and the fluid in the formation, may be determined from radiation emanating from the formation, wherein the radiation may be either naturally originating in the formation or the radiation may be induced by irradiating the formation during the well logging operation. As such, scintillation detectors are typically employed to analyze the energy content characteristics of this radiation to enable the determination of pulse-height spectrum characteristics of the gamma-rays being emitted by the formation.

As is also well known, scintillation detectors are used to detect and measure the number and energy of gamma rays present in an earth formation. Typically, a scintillation detector includes a crystal and a photomultiplier, such that when a gamma ray becomes incident upon the crystal, the incident gamma ray imparts energy to electrons in the crystal through Compton scattering, photoelectric absorption, and pair production. This introduction of energy to the electrons in the crystal causes the detector crystal lattice to become excited and when the crystal de-excites, visible or near-visible light is emitted. This scintillation is then detected by the photomultiplier and transformed into an electrical pulse having a frequency and amplitude responsive to the number of gamma rays and their respective energy levels, wherein the characteristics of the electrical pulse is typically recorded in a log for analysis.

One particular type of scintillation detector utilizes Lutetium Aluminum Perovskite, or LuAP, as its scintillation material. LuAP has been known for a number of years and is recognized as a promising host for radiation detection applications due to its exceptional combination of properties, such as high stopping power, very short decay times and reasonably good energy resolution. Unfortunately, however, most current methods for producing LuAP crystals for use in scintillation detectors are unreliable in consistently producing crystals that have both acceptable light output characteristics and material uniformity. This lack of consistency is undesirable because of its direct effect on detector resolution, photopeak shape and detector-to-detector consistency. As such, LuAP scintillation materials having unacceptable light output characteristics and/or material uniformity tend to be unusable for many applications due to decreased logging speeds and/or increasing tool-to-tool variations.

SUMMARY OF THE INVENTION

A method for improving the light output and uniformity of a LuAP scintillator crystal is provided, wherein the method includes disposing the scintillator crystal in a predetermined environment at a threshold temperature to generate an initial scintillator crystal, annealing the initial scintillator crystal in the predetermined environment at the threshold temperature to create an annealed scintillator crystal and cooling the annealed scintillator crystal in the predetermined environment to a final temperature.

An LuAP scintillation detector having an improved light output and uniformity is provided, wherein the LuAP scintillation detector includes an Lutetium Aluminum Perovskite (LuAP) scintillation material that has been annealed using a predetermined annealing process such that when the LuAP scintillation material is impinged upon by radiation, the LuAP scintillation material generates scintillation energy having a frequency and amplitude responsive to the radiation.

BRIEF DESCRIPTION OF THE DRAWINGS

The foregoing and other features and advantages of the present invention should be more fully understood from the following detailed description of illustrative embodiments taken in conjunction with the accompanying Figures in which like elements are numbered alike in the several Figures.

DETAILED DESCRIPTION

Figure 1:
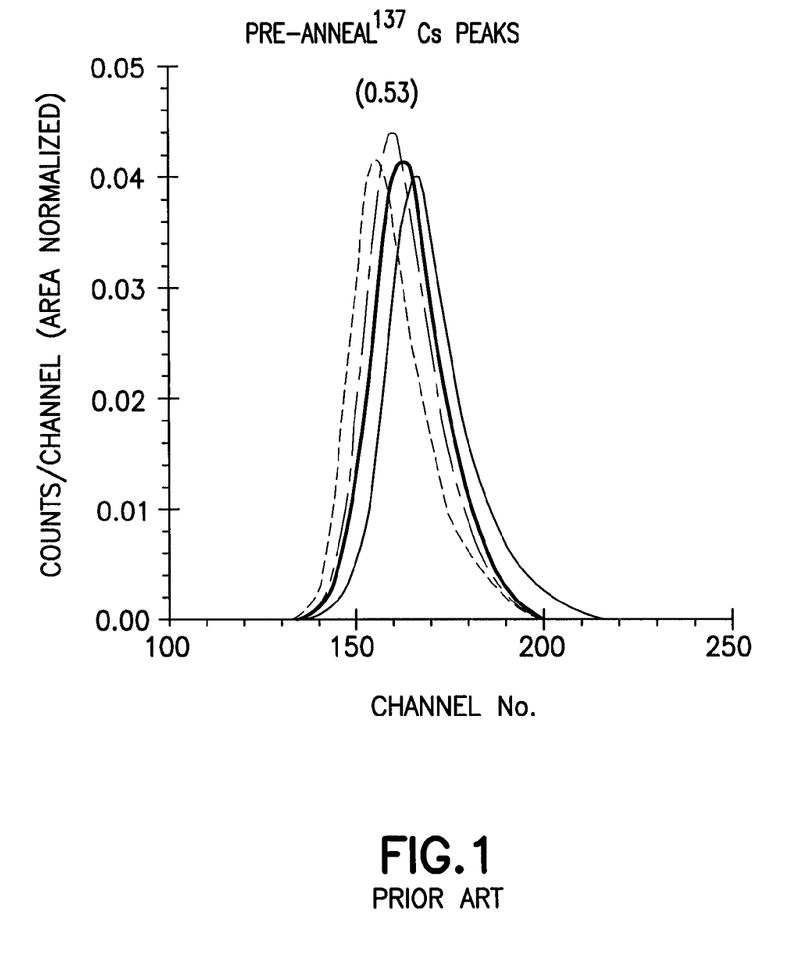
FIG. 1 is a plot of Cesium resolution measurements for an LuAP Crystal cube, in accordance with the prior art.

In accordance with an exemplary embodiment, a method for improving the performance properties of a scintillator crystal, such as a LuAP scintillator crystal, is disclosed, wherein the performance properties include the light output and material uniformity of the LuAP scintillator. This improvement will lead to a better utilization of the downhole tool by allowing for an increase in logging speed and a decrease in tool-to-tool variation by improving the detector resolution, the photopeak shape and the detector-to-detector consistency over existing LuAP scintillators. Referring to FIG. 1, a plot of Cesium resolution measurements for an LuAP Crystal cube, in accordance with the prior art (i.e.

before annealing), is shown. FIG. 1 illustrates six $Cs^{137}$ 662 keV peaks for the six cube orientations, wherein the light output was measured with each of the six sides facing the photomultiplier tube (hereinafter "PMT"). As illustrated and understood by one skilled in the art, the plot illustrates a poor level of uniformity as indicated by the scattered pattern of the six measurements.

Figure 2:
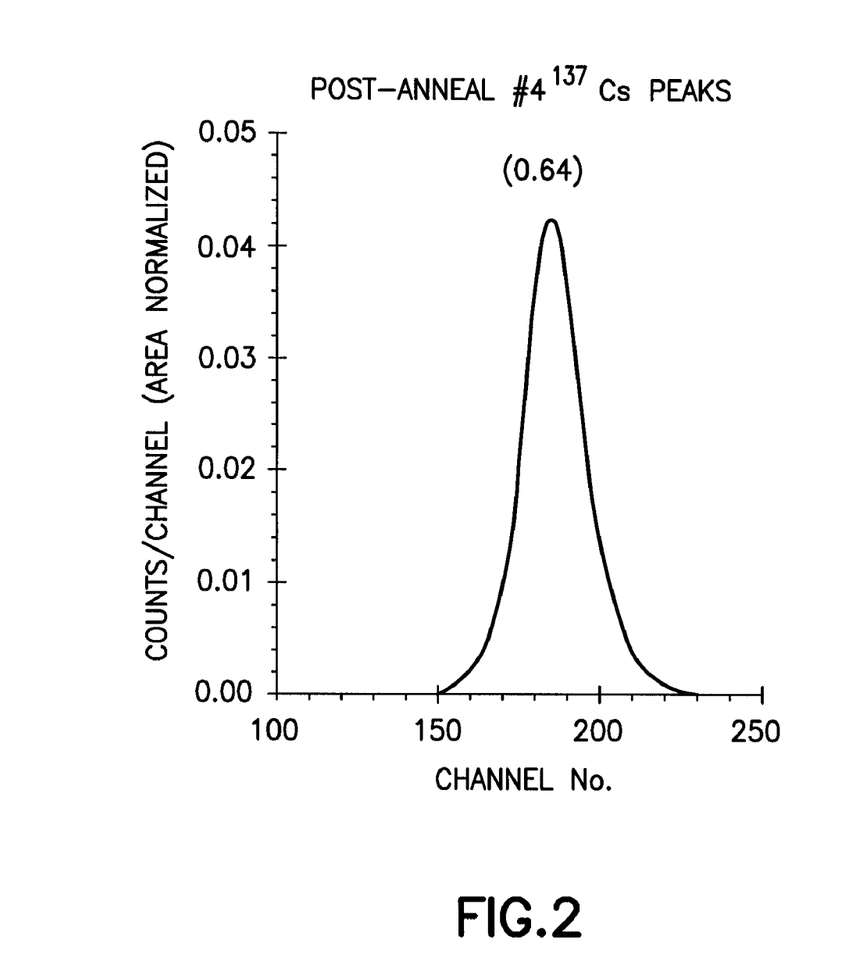
FIG. 2 is a plot of Cesium resolution measurements for an LuAP Crystal cube, in accordance with the present invention.

However, after application of the method for improving the performance properties of the LuAP scintillator to the LuAP Crystal cube, in accordance with the present invention, the performance properties of the LuAP scintillator improves dramatically. Such improvements are illustrated in FIG. 2, wherein a plot of Cesium resolution measurements for a LuAP Crystal cube after application of the method of the present invention (i.e. post-annealing) is shown. In keeping with FIG. 1, FIG. 2 illustrates the 662 keV peaks for the six cube orientations. As above, the light output was measured with each of the six sides facing the PMT. One skilled in the art will readily recognize that the plot of FIG. 2 illustrates a higher level of light output as indicated by the positions of the peaks being disposed farther to the right hand side of the graph. Also, the more tightly grouped scatter pattern of the six measurements indicates a higher level of uniformity than that shown in FIG. 1.

Figure 3:
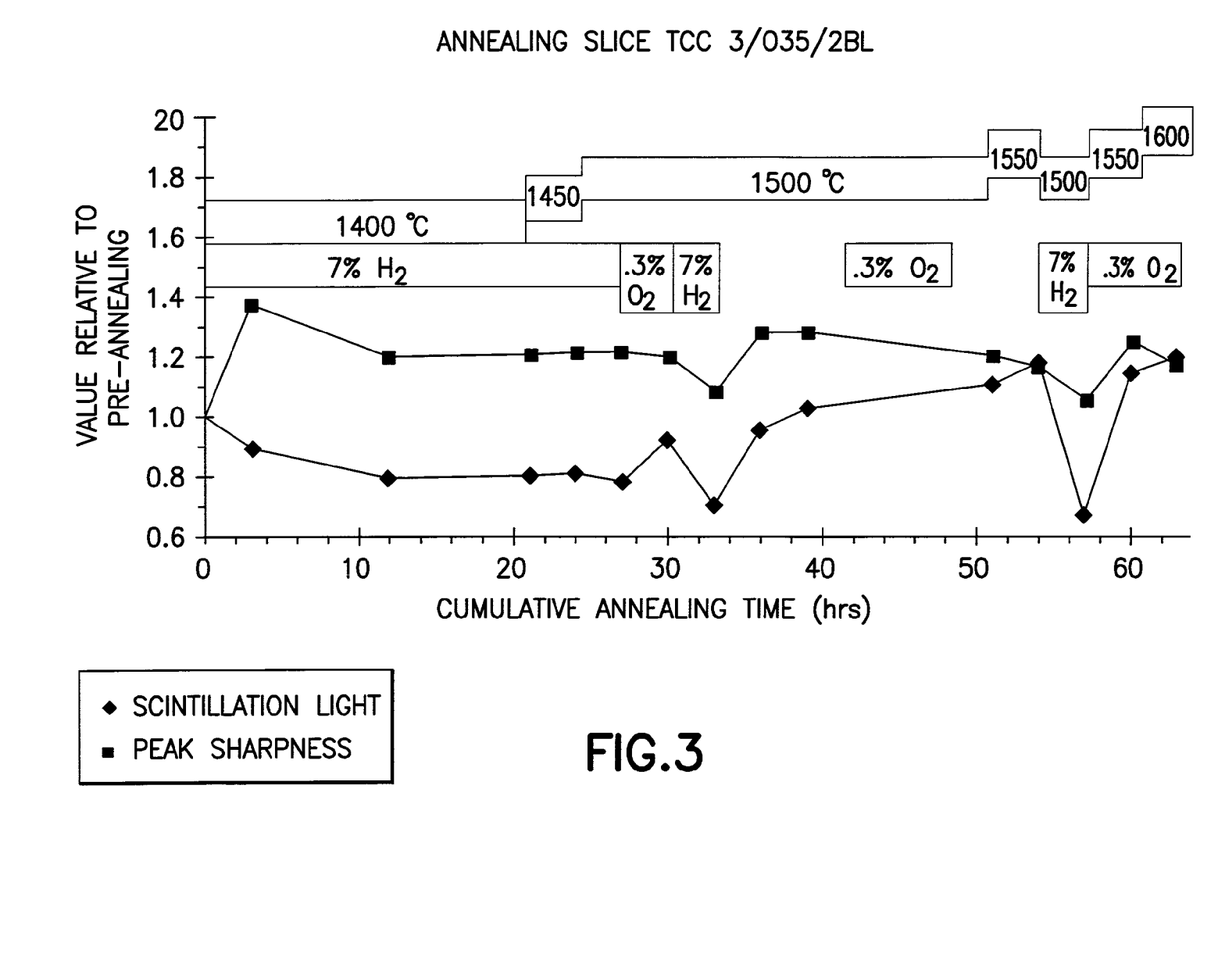
FIG. 3 is a plot illustrating the results from a series of various annealing treatments performed on a single sample of LuAP material, wherein the different annealing treatments varied in temperature, duration and atmospheric environment.

It should be appreciated that the benefits observed in response to the method of the present invention are at least partially due to the filling of oxygen vacancies in the crystal lattice of the LuAP Crystal lattice. Referring to FIG. 3, a plot illustrating the results from a series of various annealing treatments performed on a single sample of LuAP material is shown, wherein the different annealing treatments varied in temperature, duration and atmospheric environment. The illustrated annealing treatments are solely for illustrative purposes and are not intended to be limiting of the scope of the present invention. One skilled in the art will readily recognize that numerous alternative annealing techniques are applicable to the present invention. The single sample of LuAP material in FIG. 3 was annealed in an atmospheric environment comprised of nitrogen gas with various amount of either hydrogen or oxygen. It should be appreciated that with hydrogen gas present within the annealing environment oxygen will be removed from the crystal lattice (i.e. reducing environment) and with oxygen gas present within the annealing environment oxygen will be added to the crystal lattice (i.e. oxidizing environment). The plot in FIG. 3 illustrates that when the LuAP sample is annealed in the oxidizing environment (i.e. oxygen gas present in the annealing environment), the light output increases and resolution improves (i.e. the peak sharpness increases). Additionally, FIG. 3 illustrates that when the LuAP sample was annealed in the reducing environment (i.e. hydrogen gas present in the annealing environment), the light output decreased and the resolution degraded (i.e. the peak sharpness decreases).

Figure 4:
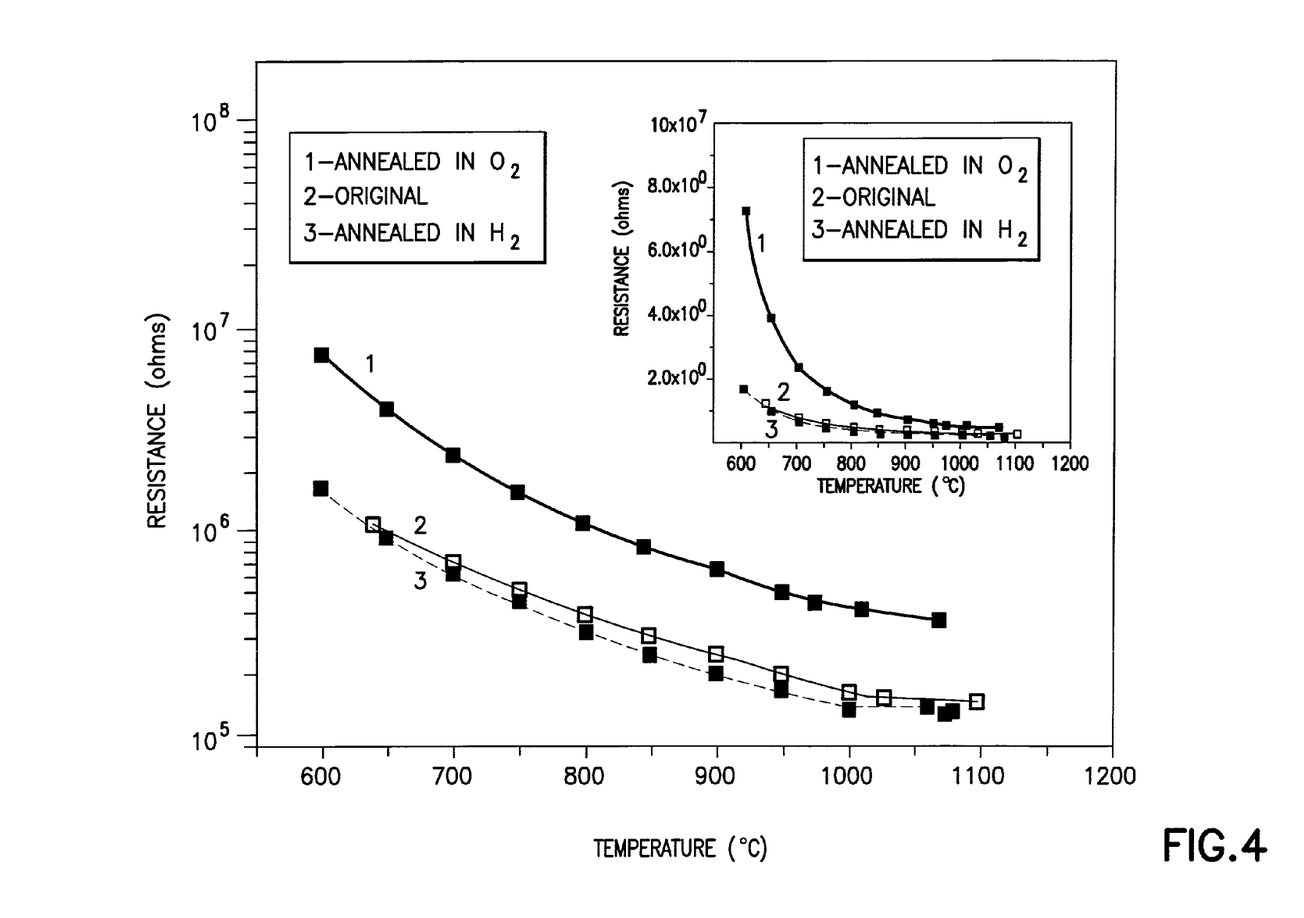
FIG. 4 is a plot illustrating the electrical resistance as a function of temperature for several LuAP samples in accordance with the present invention.

Referring to FIG. 4, a plot illustrating the resistivity as a function of temperature for several LuAP samples which have been annealed via application of the method of the present invention is shown. As can be observed by one skilled in the art, when the LuAP sample is annealed within an oxidizing environment, a take-up of oxygen into the crystal lattice of the LuAP occurs. As such, a portion of the oxygen vacancies within the crystal lattice of the sample are filled, thus reducing the concentration of vacancies within the sample material. In response, the LuAP sample that was annealed within an oxidizing environment demonstrates a higher level of resistivity. On the other hand, the LuAP sample that was annealed in the hydrogen environment exhibits a reduction in resistivity indicating an increase in concentration of crystal oxygen vacancies as oxygen is removed from the crystal lattice. It should be appreciated that an oxidizing environment can be established via any method and/or device suitable to the desired end purpose, such as, but not limited to, an introduction of oxygen, Carbon Dioxide and/or Nitrogen Oxides into the environment and/or by saturating an inert gas with water vapor. It should further be appreciated that the use of an oxidizing species, such as oxygen or water vapor, illustrates that the source of the oxidizing gas species is essentially equivalent. As such, the chemical potential of the oxidizing component of the gas mixture is one critical element of the atmosphere in contact with the crystal. For example, some atmospheres where a controlled degree of oxidation can be achieved include a gas composition that may be a mixture of $CO/CO_2$ and/or $H_2/H_2O$. The aforementioned atmospheres are not intended to be limiting in scope and are solely for illustrative purposes.

In order to establish an optimum procedure for practicing the method of the present invention, at least two physical phenomena may be considered. First, although the desired LuAP crystal material may be typically disposed in a perovskite phase, the material actually prefers to be in the garnet phase. Thus, annealing the LuAP crystal material to very high temperatures can cause some or all of the LuAP crystal material to convert to the garnet phase and be useless. Second, the LuAP crystal material may be doped with cerium to produce the scintillation light, and although the Ce3+ oxidation state is preferred since it produces the scintillation light, Cerium can exist in either the Ce3+ or Ce4+ oxidation state in the lattice. However, annealing in an oxidizing environment presents the possibility of converting some fraction of the Ce3+ to Ce4+, wherein Ce4+ ions can trap excited electrons and cause undesirable reduction of scintillation light.

Figure 5:
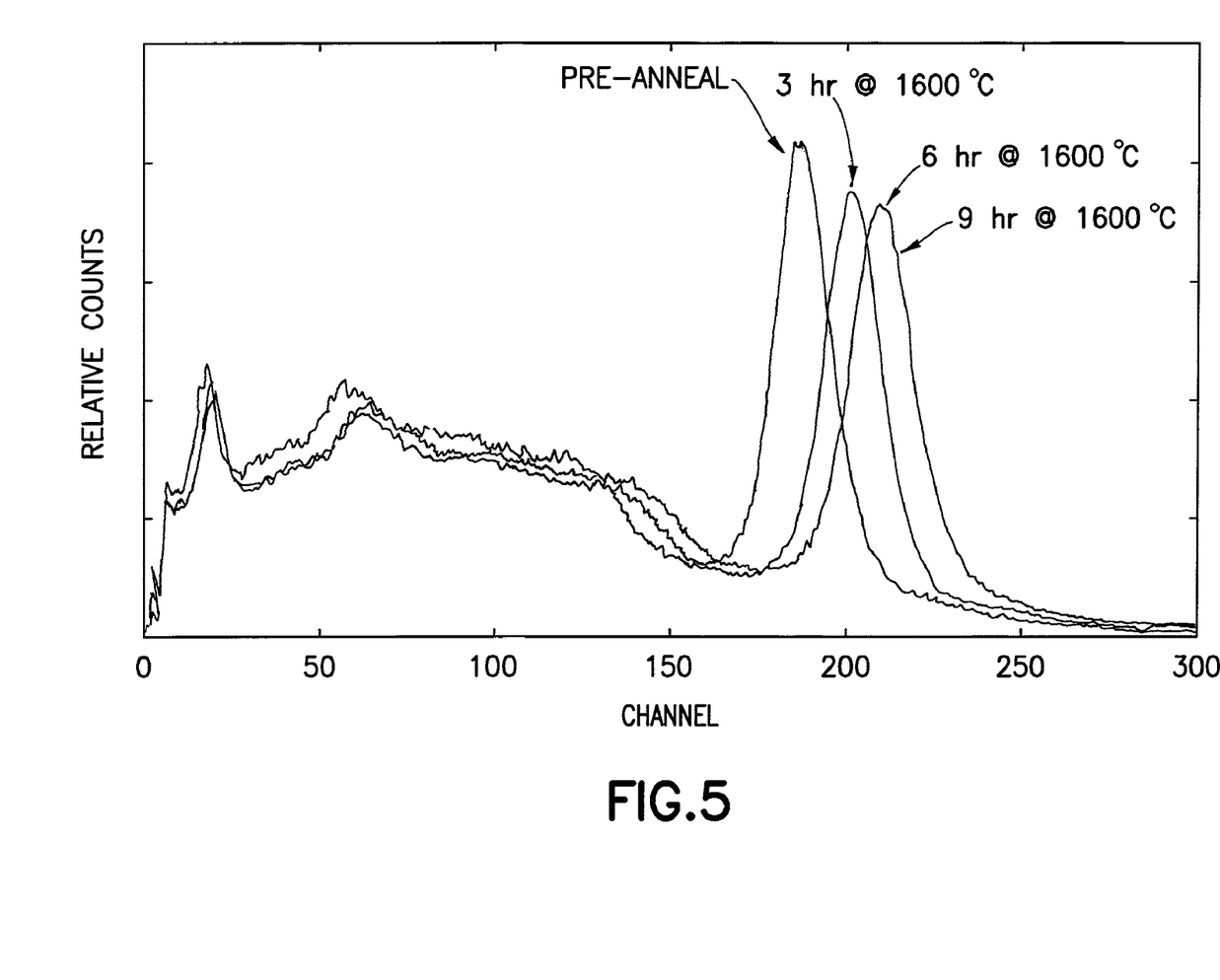
FIG. 5 is a plot illustrating resolution and light output measurements for a cube shaped LuAP crystal that was annealed in an oxidizing environment for different lengths of time.
Figure 6:
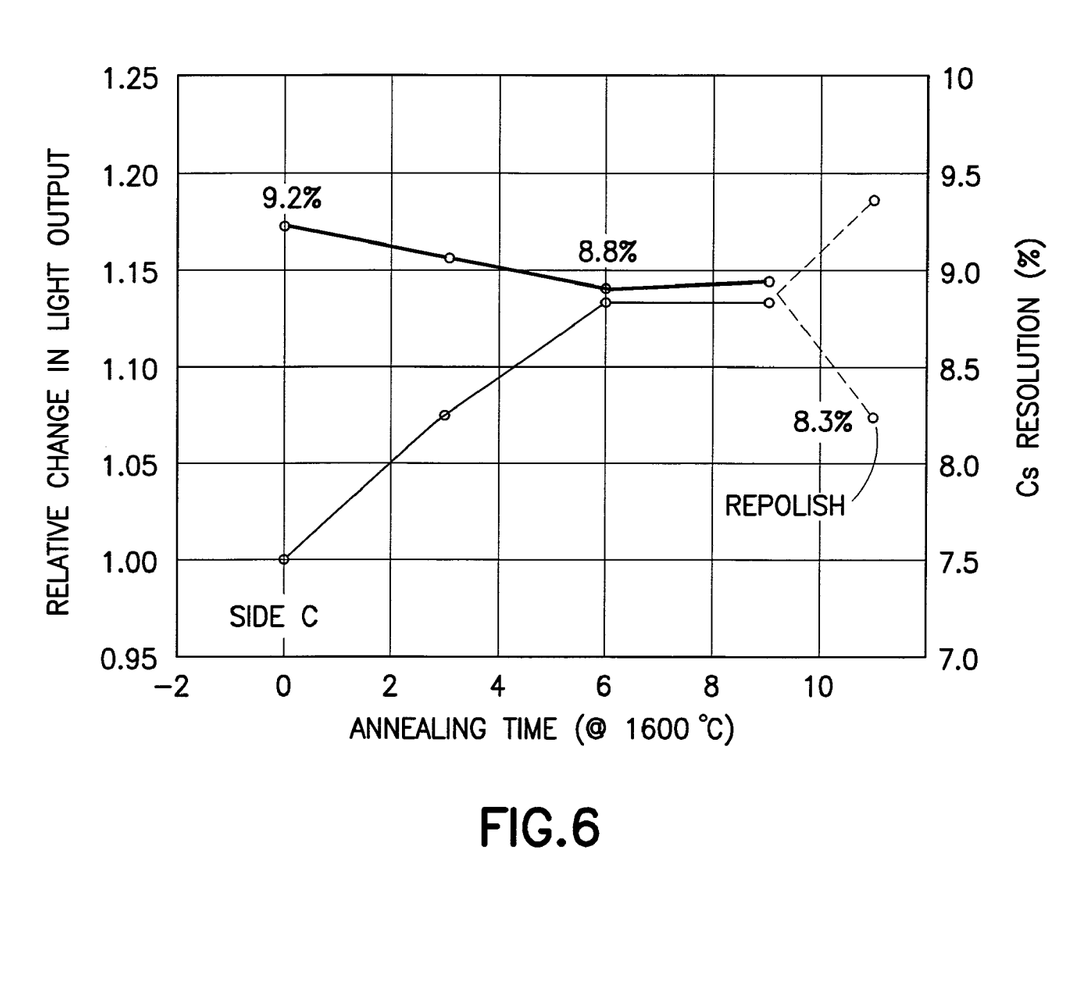
FIG. 6 is a plot illustrating the relative light output and resolution versus annealing time following a re-polishing of the detector.

Referring to FIG. 5, a plot illustrating resolution and light output measurements for a cubed shaped LuAP crystal material that was annealed in an oxidizing environment for different lengths of time is shown. As can be seen, the increase in the light output relative to the increase in annealing time is indicated by the movement of the peaks toward the right hand side of the plot. It should be appreciated that this movement of the peaks toward the right hand side of the plot shows decreased improvement after approximate six (6) hours of annealing time. However, referring to FIG. 6, a plot illustrating the relative light output and resolution versus annealing time is shown which illustrates an improvement following a re-polishing of the detector to remove the garnet phase that grew on the surface of the scintillator sample. As such, the detector performance was still improving with up to 9 hours of annealing. Therefore, it should be appreciated that significant improvements can be made to "as grown" LuAP crystal materials by annealing the "as-grown" LuAP crystal materials in an oxidizing environment, in accordance with the present invention.

It should be appreciated that in one embodiment of the present invention, annealing of LuAP crystals must typically be performed at temperatures greater than 1300° C. in order for oxygen to diffuse into the crystal lattice and fill any oxygen vacancies within the crystal. For example, one annealing temperature range for LuAP crystals that produce a positive result includes the temperature range of about 1400° C. to about 1500° C. However, for several reasons care may be taken to not allow the annealing temperature to exceed a predetermined threshold limit. First, although the rate at which the oxygen vacancies are filled typically increases with temperature, if the annealing temperature is allowed to be too high (e.g. around 1600° C. for LuAP crystals) the garnet phase formation may be accelerated. This is because excessive temperature application has been shown to accelerate the reaction that results in formation of the garnet phase. Because this typically results in a reduced light output and material non-uniformity, one skilled in the art will recognize that is generally undesirable. In addition to temperature, the amount of oxygen disposed within the annealing environment must further be considered when annealing the scintillator crystal. Although at certain oxygen concentration levels the rate at which the oxygen vacancies are filled increases, at higher oxygen concentration levels the conversion rate of $Ce^{+3}$ to $Ce^{+4}$, will eventually take place. Hence, the amount of oxygen disposed within the annealing environment must be considered. As above, this is also undesirable due to the reduction in the light output response of the crystal.

Furthermore, another factor that may be considered when annealing the scintillator crystal involves the rate at which the crystal is heated and/or cooled. This is because if the crystal is heated or cooled too rapidly, the crystal may crack. In fact, one skilled in the art will readily appreciate that the larger the crystal, the slower the heating/cooling rate required may be.

Figure 7:
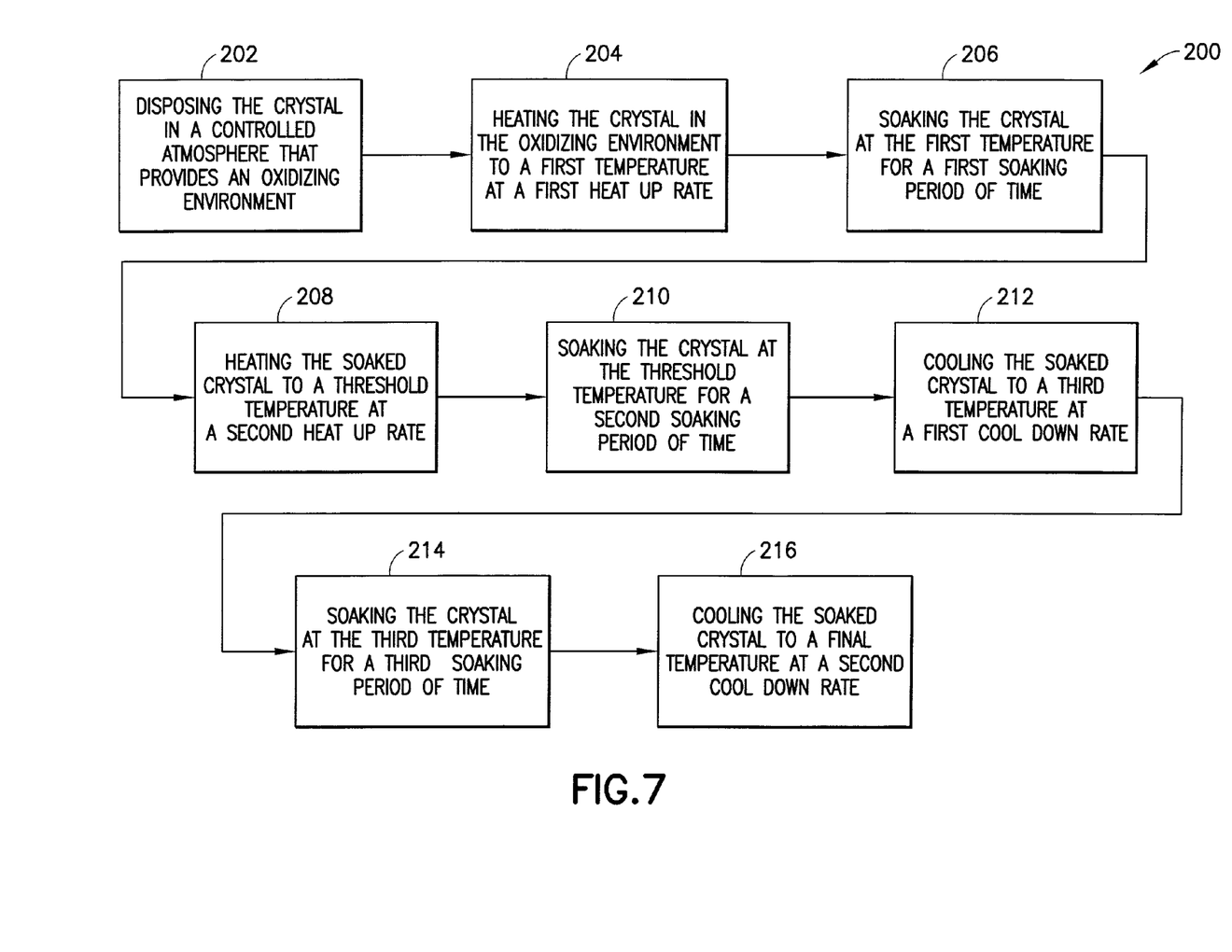
FIG. 7 is a block diagram illustrating a first embodiment of a method for improving the light output of a scintillator crystal, in accordance with the present invention.

Referring to FIG. 7, a block diagram illustrating a first embodiment of a method 200 for improving the light output of a scintillator crystal is shown and includes disposing the scintillation crystal in a controlled atmosphere that includes a gas or mixture of gases that provide an oxidizing environment, as shown in operational block 202. For example, one such environment may include Nitrogen comprising from about 0.1% to about 100% Oxygen, wherein an Oxygen content of about 3% is preferred for certain conditions. Additionally, other gases suitable to the desired end purpose may be substituted for Nitrogen, such as Helium, Neon, Krypton, Argon, Xenon and/or Radon. Furthermore, any oxidizer suitable to the desired end purpose may be used, such as Oxygen, Carbon Dioxide, Nitrogen Oxides, air and/or water vapor.

Once the controlled atmosphere is established, the scintillation crystal is heated in the oxidizing gas environment, as shown in operational block 204. It should be appreciated that the crystal may be heated to a temperature which is within the range of about 800° C. to about 1200° C., with one acceptable temperature being about 1000° C. for certain conditions. One skilled in the art will recognize that numerous alternative heating temperatures are available for use with the present invention. Furthermore, the rate at which the scintillation crystal is heated may be within the range of up to about 10° C./min, with one acceptable heat up rate being about 5° C./min for certain conditions. The scintillation crystal may then be equilibrated or 'soaked' in the oxidizing gas environment at this temperature for a predetermined soaking period of about 0.5 hours to about 2 hours, as shown in operational block 206. It should be appreciated that the predetermined soaking period may be predicated on certain conditions, such as the size of the scintillation crystal. For example, one acceptable soaking period for a 1 $cm^3$ scintillation crystal is about 2 hours, whereas for a larger scintillation crystal the soaking period may be longer than about 2 hours. Additionally, in some situations, this soaking period may not be required, thus allowing the crystal to be heated to a threshold temperature without soaking.

The scintillation crystal may then be heated to a threshold temperature, as shown in operational block 208, wherein the threshold temperature may be within the range of between about 1200° C. to 1650° C. and wherein the rate at which the crystal is heated may be about 2° C./min. It should be appreciated that one threshold temperature is about 1450° C. for certain conditions. The scintillation crystal may then be 'soaked' in this environment at this threshold temperature for a predetermined soaking period, as shown in operational block 210, wherein the predetermined soaking period may be within the range of about 1 hour to 24 hours. It should be appreciated that for a 1 $cm^3$ scintillation crystal one acceptable threshold temperature is about 1450° C. and one acceptable predetermined soaking time period is about 24 hours. At this point, the scintillation crystal is cooled to a temperature range of about 800° C. to about 1200° C. at a predetermined cool down rate, as shown in operational block 212, wherein the predetermined cool down rate may be in the range of about 1° C./min to about 10° C./min. As above, under certain conditions, such as for a 1 $cm^3$ scintillation crystal, one temperature is about 1000° C. and one cool down rate is about 2° C./min.

Once 'cooled down' to the temperature range of about 800° C. to about 1900° C., the scintillation crystal may be equilibrated or 'soaked' at this temperature for a predetermined soaking period of time, as shown in operational block 214, wherein the predetermined soaking period of time may be in the range of about 0.5 hours to about 10 hours. As above, under certain conditions, such as for a 1 $cm^3$ scintillation crystal one acceptable soaking period of time is about 2 hours. Additionally, in some situations, this soaking period may not be required, thus allowing the crystal to be cooled to a final temperature without soaking. The scintillation crystal is then cooled to a final temperature, such as room temperature, at a cool down rate in the range of up to 10° C./min, as shown in operational block 216. Again, for a scintillation crystal of 1 $cm^3$, one acceptable cool down rate may be about 5° C./min. It should be appreciated that the heat up rate and/or cool down rate is typically responsive to the size of the crystal being annealed. As such, it is contemplated that any appropriate heat up rate and/or cool down rate may be used so as long as the selected heat up rate and/or cool down rate does not lead to physical damage to the crystal either from thermal shock and/or from an inadvertent phase transition.

Figure 8:
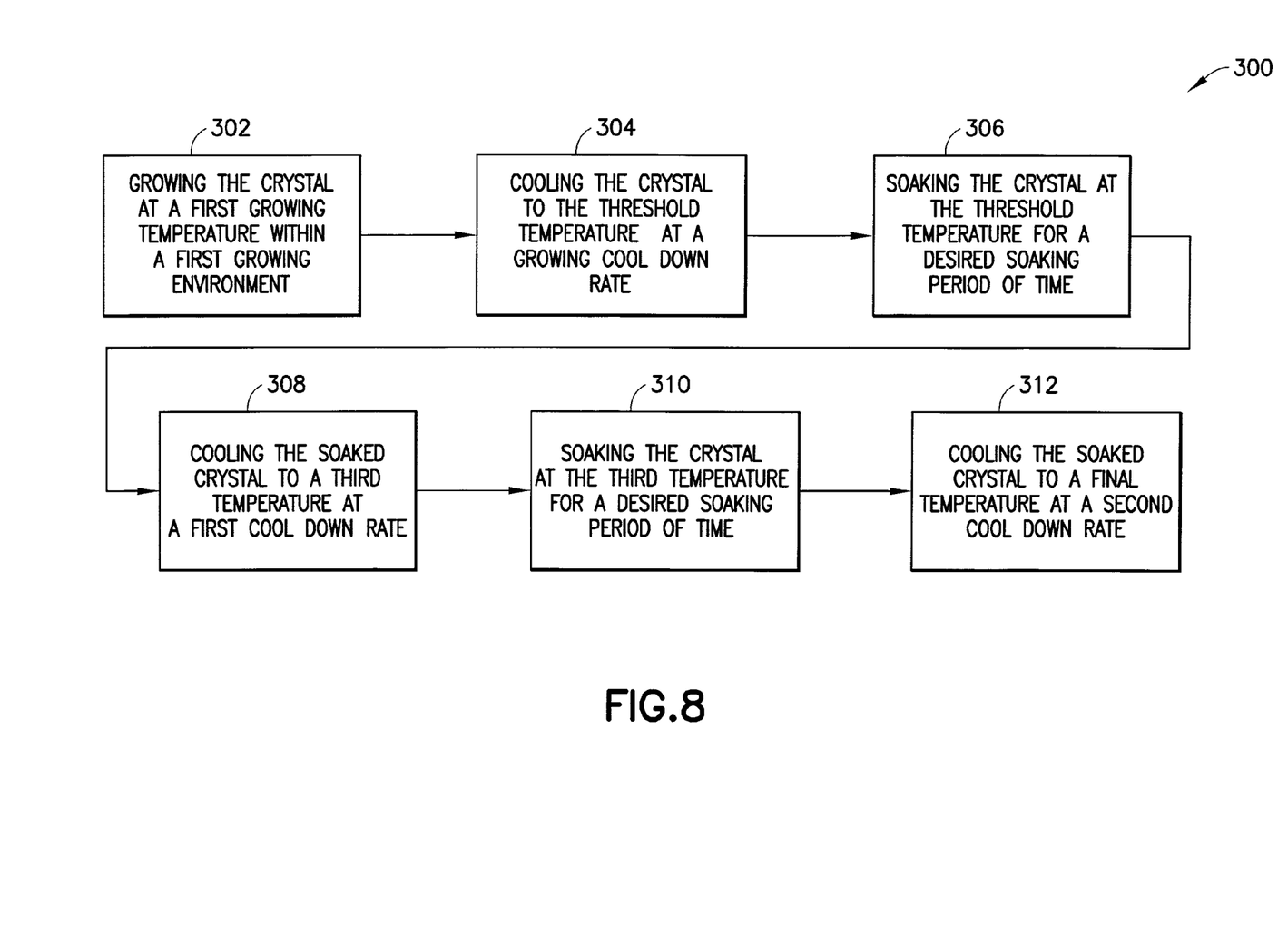
FIG. 8 is a block diagram illustrating a second embodiment of a method for improving the light output of a scintillator crystal, in accordance with the present invention.

Referring to FIG. 8, a block diagram illustrating a second embodiment of a method 300 for improving the light output of a scintillator crystal is provided and includes growing a crystal within a predetermined growing environment, as shown in operational block 302, wherein the crystal may be annealed during the cool down of the grown crystal. Once the crystal has been grown and is at a high temperature, the crystal may be cooled down to the threshold temperature, wherein the threshold temperature may be within the range of between about 1200° C. to 1650° C., as shown in operational block 304. The crystal is then 'soaked' at this threshold temperature in an oxidizing atmosphere for a predetermined soaking period, as shown in operational block 306, wherein the predetermined soaking period may be within the range of about 1 hour to 24 hours. It should be appreciated that for a 1 $cm^3$ scintillation crystal one acceptable threshold temperature is about 1450° C. and one acceptable soaking time period is about 24 hours. At this point, the scintillation crystal is cooled to a temperature range of about 800° C. to about 1900° C. at a cool down rate of about 1° C./min to about 10° C./min, as shown in operational block 308. As above, under certain conditions, such as for a 1 $cm^3$ scintillation crystal, one acceptable temperature is about 1000° C. and one acceptable cool down rate is about 2°/min.

Once 'cooled down' to the temperature range of about 800° C. to about 1900° C., the scintillation crystal is equilibrated or 'soaked' at the temperature for a predetermined soaking period of time, as shown in operational block 310, wherein the predetermined soaking period of time may be in the range of about 0.5 hours to about 10 hours. As above, under certain conditions, such as for a 1 $cm^3$ scintillation crystal one acceptable predetermined soaking period of time is about 2 hours.

The scintillation crystal is then cooled to a final temperature at a cool down rate in the range of up to 10° C./min, as shown in operational block 312, wherein the final temperature may be about room temperature. Again, for a scintillation crystal of 1 cm$^3$, one acceptable cool down rate may be about 5° C./min. It should be appreciated that during the different phases of the method 200, 300 as described hereinabove the scintillator crystal may be disposed in different environments having atmospheres comprised of different elements. For example, the crystal may be grown in one environment while the annealing may occur in another environment.

Furthermore, it should be appreciated that the LuAP scintillator of the present invention is ideal for use in spectroscopy applications (above ground and down hole applications), such as density measurements, sigma measurement (thermal neutron die-away) and gamma-ray spectroscopy. Moreover, the LuAP scintillator of the present invention has applicability not only in geological based applications, but also other applications as well, such as nuclear radiation applications. In fact, the LuAP scintillator of the present invention may be used in almost any application that employs other types of scintillators, such as NaI, CsI, BGO, GSO, and LSO, including medical, environmental, and homeland security applications.

The methods of FIG. 7 and FIG. 8 may be implemented, in part or in whole, using a controller operating in response to a computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

As such, the invention may be embodied, in part or in whole, in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for improving the light output and uniformity of a Lutetium Aluminum Perovskite (LuAP) scintillator crystal, the method comprising:
    disposing the scintillator crystal in a predetermined oxidizing environment at a threshold temperature to generate an initial scintillator crystal;
    annealing said initial scintillator crystal in said predetermined oxidizing environment at said threshold temperature to create an annealed scintillator crystal, wherein said threshold temperature is at least 1200° C. or greater; and
    cooling said annealed scintillator crystal in said predetermined oxidizing environment to a final temperature.

2. The method of claim 1, wherein said disposing further includes,
    heating the scintillator crystal to a first temperature at a first heat up rate;
    soaking the scintillator crystal at said first temperature for a first soaking period to generate said initial scintillator crystal; and
    heating said initial scintillator crystal to said threshold temperature at a second heat up rate.

3. The method of claim 2, wherein said first temperature is within a range of between about 800° C. and about 1200° C. and wherein said first heat up rate is within a range of up to about 10° C./min.

4. The method of claim 2, wherein said first soaking period is between about 0.5 hours and about 2 hours.

5. The method of claim 2, wherein said first temperature is about 1000° C., said first heat up rate is about 5° C./min and said first soaking period of time is about 2 hours.

6. The method of claim 2, wherein at least one of said threshold temperature is between about 1200° C. to about 1650° C. and said second heat up rate is about 2° C./min.

7. The method of claim 2, wherein at least one of said threshold temperature is about 1450° C. and said second heat up rate is about 2° C./min.

8. The method of claim 1, wherein said disposing further includes,
    growing the scintillator crystal in a predetermined growing environment at a growing temperature; and
    cooling the scintillator crystal from said growing temperature to said threshold temperature.

9. The method of claim 1, wherein said annealing includes soaking said initial scintillator crystal in said predetermined oxidizing environment at said threshold temperature for a second soaking period.

10. The method of claim 9, wherein said second soaking period is between about 1 hour and about 24 hours.

11. The method of claim 9, wherein said second soaking period is about 24 hours.

12. The method of claim 1, wherein said cooling further includes,
    cooling said annealed scintillator crystal to a third temperature at a first cool down rate;
    soaking said annealed scintillator crystal at said third temperature for a third soaking period; and
    cooling said annealed scintillator crystal to said final temperature at a second cool down rate.

13. The method of claim 12, wherein at least one of said third temperature is between about 800° C. and about 1900° C., said first cool down rate is between about 1° C./min and about 10° C./min and said third soaking period is between about 0.5 hours and about 10 hours.

14. The method of claim 12, wherein at least one of said third temperature is 1000° C., said first cool down rate is 2° C./min and said third soaking period is about 2 hours.

15. The method of claim 12, wherein at least one of said final temperature is between about 20° C. and about 25° C. and said second cool down rate is up to about 10° C./min.

16. The method of claim 12, wherein at least one of said final temperature is between about 20° C. and about 25° C. and said second cool down rate is about 5° C./min.

17. The method of claim 1, wherein said predetermined oxidizing environment includes between about 0.1% Oxygen and about 100% Oxygen.

18. The method of claim 1, wherein said predetermined oxidizing environment includes about 3% Oxygen.

19. The method of claim 1, wherein said predetermined oxidizing environment includes at least one of a Nitrogen component, an Oxygen component, a Helium component, a Neon component, a Krypton component, an Argon component, a Xenon component and/or a Radon component.

20. The method of claim 18, wherein said predetermined oxidizing environment includes an oxidation/reduction pair, said oxidation/reduction pair including at least one of Carbon Dioxide/Carbon Monoxide, Hydrogen/Water Vapor and Hydrogen/Nitrogen Oxide.

* * * * *